(12) United States Patent
Ran

(10) Patent No.: US 7,961,831 B2
(45) Date of Patent: Jun. 14, 2011

(54) MEASURING A HORIZONTAL EYE OPENING DURING SYSTEM OPERATION

(75) Inventor: Adee Ran, Maayan Baruch (IL)

(73) Assignee: Intel Corporation, Santa Clara, CA (US)

( * ) Notice: Subject to any disclaimer, the term of this patent is extended or adjusted under 35 U.S.C. 154(b) by 1111 days.

(21) Appl. No.: 11/729,712

(22) Filed: Mar. 29, 2007

(65) Prior Publication Data

US 2008/0240319 A1 Oct. 2, 2008

(51) Int. Cl.
*H04L 7/00* (2006.01)

(52) U.S. Cl. ........................................................ 375/355

(58) Field of Classification Search .................. 375/354, 375/373, 376, 355, 357, 371
See application file for complete search history.

(56) References Cited

U.S. PATENT DOCUMENTS

| | | | |
|---|---|---|---|
| 6,594,331 B1 * | 7/2003 | Soda | 375/376 |
| 7,627,029 B2 * | 12/2009 | Ho et al. | 375/229 |
| 2002/0060820 A1 * | 5/2002 | Buchali | 359/109 |
| 2004/0114702 A1 * | 6/2004 | Friedman et al. | 375/373 |
| 2004/0264615 A1 * | 12/2004 | Ho et al. | 375/355 |
| 2005/0111852 A1 * | 5/2005 | Mahgerefteh et al. | 398/187 |
| 2006/0078078 A1 * | 4/2006 | Moriizumi | 375/373 |

\* cited by examiner

*Primary Examiner* — Chieh M Fan
*Assistant Examiner* — Jaison Joseph
(74) *Attorney, Agent, or Firm* — Trop, Pruner & Hu, P.C.

(57) ABSTRACT

In one embodiment, the present invention includes a method for receiving an incoming signal from a communication channel at a receiver, sampling the incoming signal in first and second samplers that are independently clocked, comparing outputs of the samplers, and outputting a measure of a horizontal eye opening of the incoming signal based on the comparison. Other embodiments are described and claimed.

14 Claims, 3 Drawing Sheets

US 7,961,831 B2

MEASURING A HORIZONTAL EYE OPENING DURING SYSTEM OPERATION

BACKGROUND

In a receiver of a communications system such as an Ethernet communications system, an eye pattern can be obtained that is a superposition of all possible realizations of the received signal as viewed within a particular signaling interval. The width of the eye opening defines the time interval over which the received signal can be sampled without imposition of errors such as errors caused by inter-symbol interference. Additional parameters associated with an eye pattern such as the slope of the pattern can be a measure of receiver sensitivity, while the vertical eye opening can define a noise margin for the receiver.

Typically, on-line measures of vertical eye opening can be obtained with limited additional hardware on a receiver. However, on-line horizontal eye measurements require an additional phase interpolator, increasing the cost, complexity, area, and power consumption of the receiver due to this costly analog circuit.

DETAILED DESCRIPTION

In various embodiments, an on-line measurement of a vertical eye opening of a received signal may be generated. That is, the horizontal eye opening may be measured to provide a determination of timing margin with respect to an eye opening of incoming data. By on-line, it is meant that the measurement is done while receiving actual data, rather than an off-line measurement done using transmission of test data that is known ahead of time to the receiver. In this way, a real-time on-line link quality monitor may be provided for a user of a communication system. In various embodiments, an inherent phase variation between a primary and secondary slicer may be used to scan the eye horizontally, allowing a measurement to be performed while using low power and reduced hardware. In this way, horizontal eye measurements may be made without the need for a dedicated phase interpolator.

Figure 1:
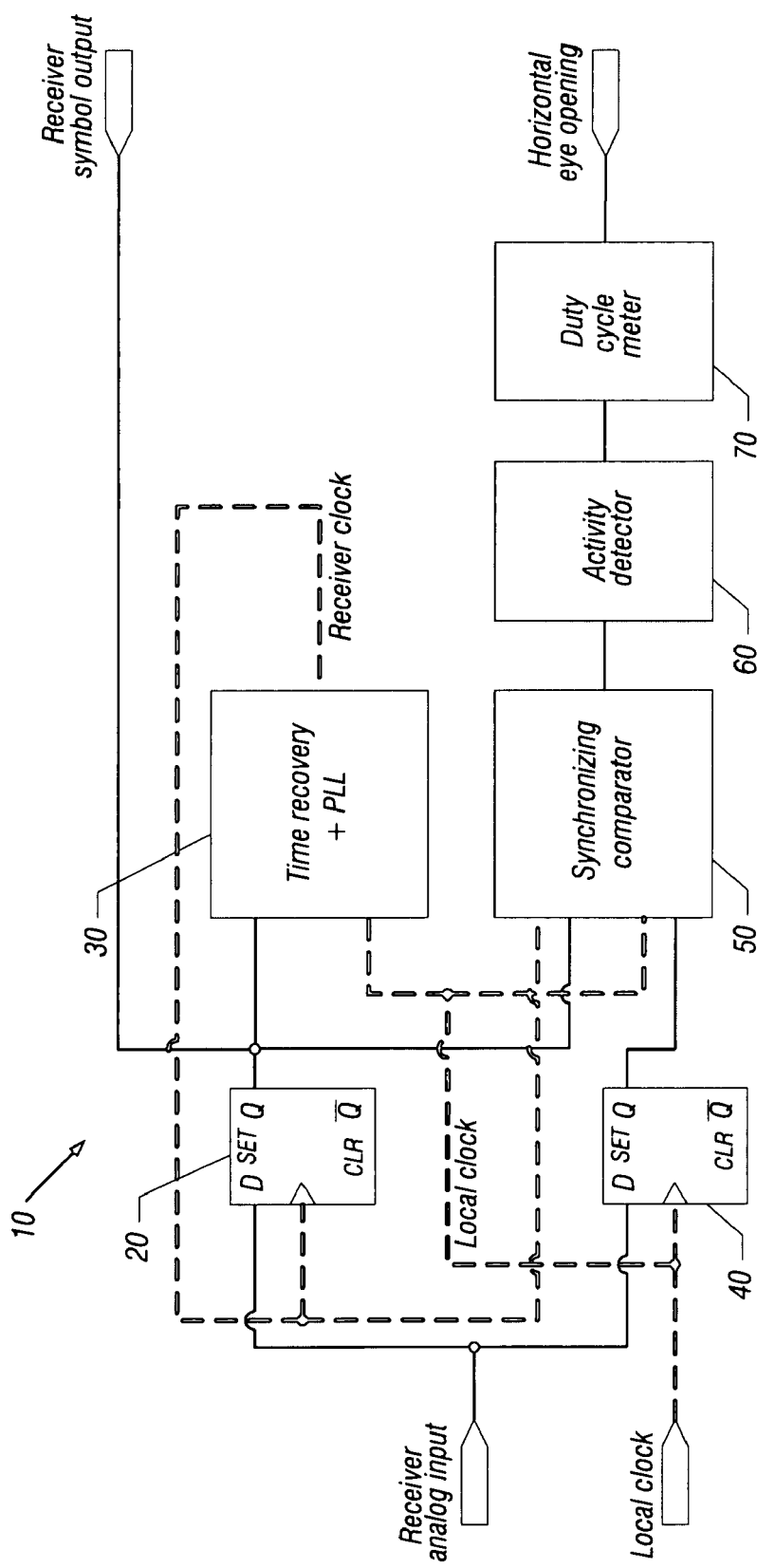
FIG. 1 is a block diagram of a portion of a receiver in accordance with an embodiment of the present invention.

Referring now to FIG. 1, shown is a block diagram of a portion of a receiver in accordance with an embodiment of the present invention. As shown in FIG. 1, system 10, which may be a portion of a receiver such as an Ethernet receiver, includes a primary slicer or sampler 20 to receive an incoming analog input, which may be received from a link coupled to a transmitter. As shown in the embodiment of FIG. 1, primary sampler 20 may be a D-type flip-flop, although the scope of the present invention is not limited in this regard. Note that primary sampler 20 may be clocked by a receiver clock that is recovered from the received input signal. Specifically, as shown in FIG. 1, primary sampler 20 has an output coupled to a timing recovery and phase lock loop 30 (hereafter PLL 30). PLL 30 thus generates the receiver clock that is fed back to a clock input of primary sampler 20. Furthermore, the output of primary sampler 20 also corresponds to the received symbol output that is provided on a separate line for further processing by other portions of the receiver.

Still referring to FIG. 1, a secondary sampler 40, which may also be a D-type flip-flop, is coupled to receive the incoming data. In contrast to primary sampler 20, however, secondary sampler 40 is clocked by a local clock signal. This local clock signal has a varying phase with respect to the receiver clock due to frequency offset and low-frequency jitter. Secondary sampler 40 also provides output signals at its respective timing. Furthermore, primary sampler 20 and secondary sampler 40 need not be identical, as primary sampler 20 may have additional outputs, higher resolution and so forth, as may be used for other receiver functionality. In a pulse amplitude modulation/binary phase shift keying (PAM2/BPSK) communication system, each of primary sampler 20 and secondary sampler 40 may output a single bit at its clock sampling point. Note that the two symbol streams may have different timing, but their clock intervals are both within a predetermined tolerance of a unit interval (UI). Note that embodiments may be applicable to many different signaling schemes, including PAM3 and PAM4 and higher, and receiver architectures in which an equalizer may be placed between primary sampler 20 and a final decision output.

As shown in FIG. 1, the recovered symbols from both primary sampler 20 and secondary sampler 40 are provided to a synchronizing comparator 50. Comparator 50 may periodically select one symbol and latch it for several clock cycles (e.g., N>=2). That is, comparator 50 may be activated only every few cycles, reducing power consumption and complexity. To reduce power consumption, N may be increased (and frequency reduced) further. As shown, comparator 50 also receives both clock signals (i.e., the local clock and the receiver clock). The selection and latching of symbols may be performed in parallel for the two clock/symbol pairs. The latched symbols from both samplers can be synchronized to one of the clocks for purposes of comparison. Comparator 50 thus outputs a single bit (e.g., high/low, corresponding to equal/different, respectively) once every N receiver clock cycles, assuming the receiver clock is used for purposes of the synchronization.

During operation of receiver 10, assume that during a given time period, the receiver clock and the local clock operate at a substantially equal phase. Accordingly, primary sampler 20 and secondary sampler 40 operate at the same instance and thus their outputs will be equal. At this point in time, comparator 50 may output an equal value consistently. On the other hand, in other time periods the local clock's phase may differ enough from the receiver clock's phase such that secondary sampler 40 is in the closed region of the eye pattern while primary sampler 20 is in the open region of the eye pattern. Accordingly, the samplers provide different outputs corresponding to this transition. During such time periods, comparator 50 may generate an output that toggles between equal and different values (i.e., between logic high and logic low values). The term "transition" refers to changes in state or transitions between data symbols. When no such transition occurs, the outputs of the two samplers are equal, and the reason for the "toggling" at the comparator output.

Due to this toggling, comparator 50 may be coupled to an activity detector 60, which acts to rectify the comparator's decision to a quasi-stable state, i.e., equal or different. Accordingly, the output of activity detector 60 may indicate whether the local clock is in the open region or the closed region of the eye.

Figure 2:
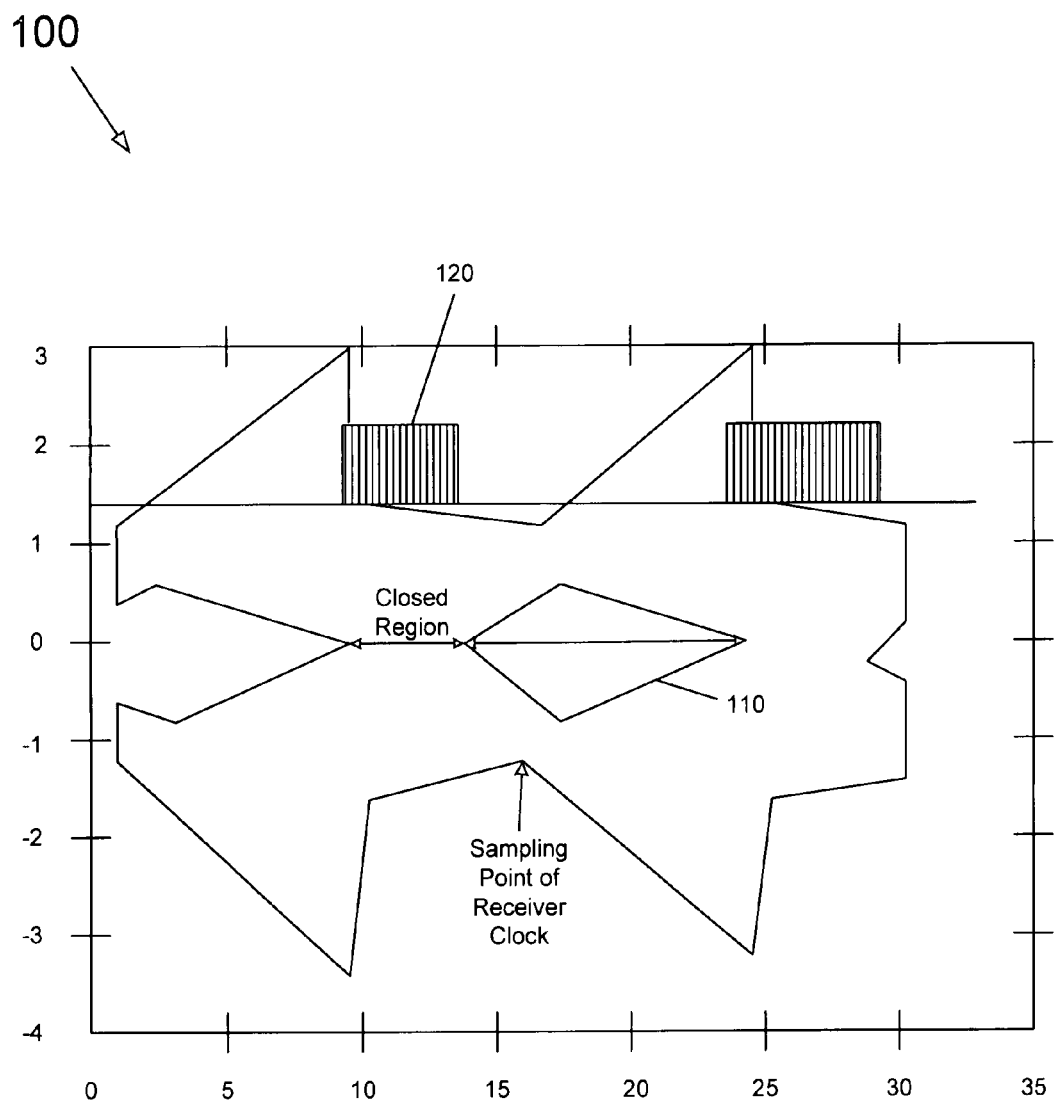
FIG. 2 is an eye diagram showing a comparator output in accordance with one embodiment of the present invention.

Referring now to FIG. 2, shown is an illustration of an eye diagram that also includes comparator outputs in accordance with an embodiment of the present invention. As shown in FIG. 2, eye diagram 100 may correspond to incoming signals received by a receiver, e.g., from a communication channel. As shown, the various received signals that transition from logic low to logic high states create an open region 110. Note that the receiver clock may be controlled such that primary sampler 20, which is clocked by the receiver clock, samples its input in the substantial middle portion of the open region, i.e., when the vertical eye opening is at its substantially largest.

To provide a measure of horizontal eye opening, an embodiment such as FIG. 1 may be used. Specifically, the output of comparator 50 is shown in FIG. 2. When the comparator output is toggling between low and high states as shown by the up and down transitions in the comparator output signal 120, the receiver clock and local clocks may be out of phase. In contrast, the comparator output may be of a steady state when the phase difference is within the horizontal eye opening, as shown in FIG. 2. Note that pattern 100 of FIG. 2 may be output on a display to thus provide a measure of horizontal eye opening. For example, a display of a system that includes or is coupled to a receiver having an embodiment such that of FIG. 1 may thus provide a visual measure of horizontal eye opening, although other implementations are possible.

If the phase difference between the two clocks changes linearly over time as in the case of a constant frequency offset between the two clocks, secondary sampler 40 may operate to scan the eye horizontally. Accordingly, the output of activity detector 60 may be a pulse width modulated (PWM) measurement of the horizontal eye opening with a constant duty cycle. If instead the phase changes monotonically but not linearly (e.g., when a low-frequency jitter is present), the duty cycle will not be constant, however, its average over time may represent the average horizontal eye opening.

Still referring to FIG. 1, a duty cycle meter 70 may be coupled to an output of activity detector 60 to thus provide a measurement of the duty cycle, thus providing an indication of the horizontal eye opening, which may be provided to additional receiver circuitry, stored in a storage medium, or output to a display for analysis by an end user. In some implementations, comparator 50, activity detector 60, and duty cycle meter 70 may operate at a lower (and in some embodiments, substantially lower) frequency than the receiver clock.

Note that if the phase difference is nearly linear over time, the symmetry of the horizontal eye opening can be observed by adding a second output to comparator 50. This second output of comparator 50 may indicate the center position in the scan when the two clocks phases are nearly equal. Such an output may be provided to an analog detector, in some embodiments.

Figure 3:
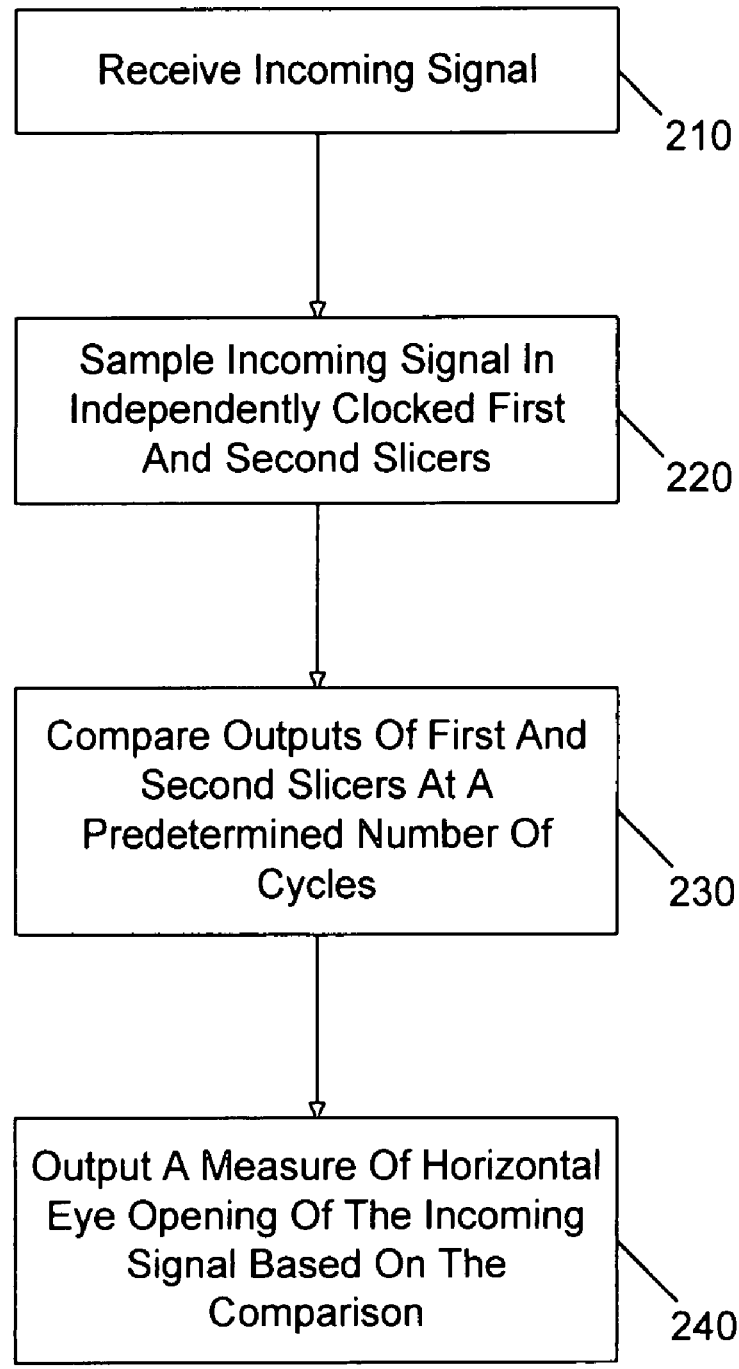
FIG. 3 is a flow diagram of a method in accordance with an embodiment of the present invention.

Referring now to FIG. 3, shown is a flow diagram of a method in accordance with an embodiment of the present invention. As shown in FIG. 3, method 200 may be used to obtain information and generate a measure of horizontal eye opening of an incoming signal to a receiver. As shown in FIG. 3, method 200 may begin by receiving the incoming signal (block 210). The incoming signal may be sampled in multiple independently clocked samplers (block 220). Then, the outputs of the multiple samplers may be compared at a predetermined number of cycles (block 230). For example, one of the two clocks that clock the independent samplers may be used to clock a comparator to wake up at a predetermined number of clock cycles to make the comparison. Based on the comparison, an output of the measure of horizontal eye opening may be provided (block 240). For example, a display coupled to the receiver may provide a measure of horizontal eye opening, e.g., by way of a value of the horizontal eye opening, a signal on the display or so forth. While shown with this particular implementation in the embodiment of FIG. 3, the scope of the present invention is not limited in this regard.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
    a primary sampler to receive an incoming signal and provide an output symbol corresponding to the incoming signal, the primary sampler controlled by a receiver clock generated from the incoming signal;
    a secondary sampler coupled to receive the incoming signal, the secondary sampler to generate a second symbol corresponding to the incoming signal, the secondary sampler clocked by a local clock independent of the receiver clock, wherein the local clock has a varying phase with regard to the receiver clock;
    a comparator coupled to receive the output symbol, the second symbol, the receiver clock and the local clock, the comparator to output an indication of whether the symbol and the second symbol are equal or different with respect to a predetermined number of clock cycles of the receiver clock or the local clock;
    an activity detector coupled to the comparator output to rectify the comparator output; and
    a duty cycle meter coupled to an output of the activity detector to provide a measurement of a horizontal eye opening of the incoming signal.

2. The apparatus of claim 1, wherein the measurement of the horizontal eye opening is to be performed during on-line operation of a receiver including the primary sampler, the secondary sampler and the comparator.

3. The apparatus of claim 2, further comprising a display coupled to the receiver to display the measurement of the horizontal eye opening.

4. The apparatus of claim 1, wherein the comparator output is to toggle between a first state and a second state for a time period if the local clock phase is outside the horizontal eye opening.

5. The apparatus of claim 4, wherein the comparator output is to be at a high state for the time period if the receiver clock and the local clock have a substantially equal phase.

6. A method comprising:
    receiving an incoming signal from a communication channel at a receiver;

sampling the incoming signal in a first sampler and a second sampler, wherein the first sampler and the second sampler are independently clocked;

comparing outputs of the first sampler and the second sampler at a predetermined number of clock cycles of a first clock or a second clock;

rectifying a result of the comparing and generating a duty cycle measure of the rectified result; and outputting a measure of a horizontal eye opening of the incoming signal based on the rectified result.

7. The method of claim 6, further comprising recovering the first clock from the incoming signal and clocking the first sampler with the first clock.

8. The method of claim 7, further comprising clocking the second sampler with the second clock generated in the receiver.

9. The method of claim 6, further comprising disabling the comparing, the rectifying, and the duty cycle measuring operations for a plurality of clock signals between the predetermined number of clock cycles.

10. An apparatus comprising:

a first sampler to receive an incoming signal and provide an output symbol corresponding to the incoming signal, the first sampler controlled by a first clock generated from the incoming signal;

a second sampler coupled to receive the incoming signal, the second sampler to generate a second symbol corresponding to the incoming signal, the second sampler clocked by a second clock independent of the first clock;

a comparator coupled to receive the output symbol, the second symbol, the first clock and the second clock, the comparator to output an indication of whether the symbol and the second symbol are equal or different with respect to a plurality of clock cycles of one of the first and second clocks; and a duty cycle meter coupled to an output of the comparator to provide a measurement of a horizontal eye opening of the incoming signal.

11. The apparatus of claim 10, wherein the comparator output is to toggle between a first state and a second state for a time period if the second clock phase is outside the horizontal eye opening.

12. The apparatus of claim 11, wherein the comparator output is to be at a high state for the time period if the first and second clocks have a substantially equal phase.

13. The apparatus of claim 10, wherein the first clock is recovered from the incoming signal and the second clock is generated in the apparatus.

14. The apparatus of claim 10, further comprising an activity detector coupled to the comparator output.

* * * * *